United States Patent [19]
Pohjalainen et al.

[11] Patent Number: 5,521,483
[45] Date of Patent: May 28, 1996

[54] METHOD OF DETERMINING A RESIDUAL FLUX OF AN INVERTER-SUPPLIED SQUIRREL CAGE/INDUCTION MACHINE

[75] Inventors: Pasi Pohjalainen, Helsinki; Pekka Tiitinen, Vaasa, both of Finland

[73] Assignee: ABB Stromberg Drives Oy, Helsinki, Finland

[21] Appl. No.: 374,703
[22] PCT Filed: Jul. 1, 1993
[86] PCT No.: PCT/FI93/00281
    § 371 Date: Feb. 6, 1995
    § 102(e) Date: Feb. 6, 1995
[87] PCT Pub. No.: WO94/03965
    PCT Pub. Date: Feb. 17, 1994

[30] Foreign Application Priority Data

Jul. 29, 1992 [FI] Finland ................................. 923431

[51] Int. Cl.$^6$ ............................................. H02P 5/42
[52] U.S. Cl. ......................... 318/804; 318/807; 318/808
[58] Field of Search .......................... 318/800–808, 318/809

[56] References Cited

U.S. PATENT DOCUMENTS

| | | | |
|---|---|---|---|
| 4,629,961 | 12/1986 | Blaschke | 318/803 |
| 4,642,546 | 2/1987 | Schönherr | |
| 4,767,976 | 8/1988 | Mutoh et al. | 318/808 |
| 5,003,243 | 3/1991 | Tadakuma et al. | 318/800 |
| 5,204,607 | 4/1993 | Hügel et al. | 318/806 |
| 5,334,923 | 8/1994 | Lorenz et al. | 318/805 |

FOREIGN PATENT DOCUMENTS 0142808  5/1985  European Pat. Off. .
0469177  2/1992  European Pat. Off. .

Primary Examiner—John W. Cabeca
Attorney, Agent, or Firm—Watson, Cole, Stevens, Davis

[57] ABSTRACT

The invention relates to a method of determining rotational speed, size and instantaneous direction of a residual flux of an inverter-supplied squirrel cage induction machine, to be used for starting the squirrel cage induction machine when there is a rotating residual flux ($\vec{\Psi}_s$) in the machine (1) and a total leakage inductance ($\sigma L_s$) of the machine is known. According to the invention measures are taken, comprising steps of short-circuiting stator windings; measuring a first stator current vector ($\vec{i}_{s1}$) and switching off the stator circuit at the end of a first time period ($T_1$); short-circuiting the stator windings once more after a second time period ($T_2$) from the end of the first time period ($T_1$); measuring a second stator current vector ($\vec{i}_{s2}$) and switching off the stator circuit after a time identical with the first time period ($T_1$) from the second short-circuiting; determining the frequency ($\vec{\Psi}_s$) of the residual flux ($\omega_s$) on the basis of the directions of the first and the second stator current vector ($\vec{i}_{s1}$, $\vec{i}_{s2}$) and the lengths of the first and the second time period; determining the size of an absolute value ($|\vec{\Psi}_s|$) of the residual flux on the basis of the total leakage inductance ($\sigma L_s$) of the squirrel cage induction machine and the first or the second stator current vector ($\vec{i}_1$, $\vec{i}_{s2}$ and determining the instantaneous direction of the residual flux ($\vec{\Psi}_s$) on the basis of the direction of the first or the second stator current vector ($\vec{i}_{s1}$, $\vec{i}_{s2}$).

8 Claims, 2 Drawing Sheets

METHOD OF DETERMINING A RESIDUAL FLUX OF AN INVERTER-SUPPLIED SQUIRREL CAGE/INDUCTION MACHINE

BACKGROUND OF THE INVENTION

The present invention relates to a method of determining rotational speed, size and instantaneous direction of a residual flux of an inverter-supplied squirrel cage induction machine, to be used for starting the squirrel cage induction machine when there exists a rotating residual flux in the machine and a total leakage inductance of the machine is known.

The method of the invention can be used for instance for inverter drives, in which a restarting command can turn up after the operation has been stopped, before the flux of the squirrel cage induction machine has disappeared. The invention can further be used for a quick recovery from disturbances, such as mains interruption or inverter overcurrent release. The method can also be used when a squirrel cage induction motor is connected from a mains supply to an inverter.

EP Patent 469 177 discloses a method according to the prior art, by which a squirrel cage induction machine is started in a situation when there exists a rotating residual flux in the machine. In the method described in this publication, the computing time is at least twice the period of a basic cycle of the residual flux, and after the rotation has been measured, a magnetization current of the squirrel cage induction machine shall be raised to the nominal value before changing over to a controlled operation. Accordingly, the starting provided by this method is relatively slow and a direct change-over to a controlled supply of the squirrel cage induction machine is not possible at this starting.

The object of the present invention is to provide a method by means of which the residual flux rotating in the squirrel cage induction machine can be determined in such a way that a voltage feed to the motor, synchronized with a residual magnetic flux therein, can begin immediately after the determination of the flux. The method must not be dependent on how the rotating flux has been generated in the squirrel cage induction machine before the machine is started by inverter supply.

The object of controlling an asynchronous machine is generally to cause a desired behaviour of a moment-generated by the machine, when the current and the voltage fed to the machine are known. The purpose is then to influence the electric moment, the relative value of which as a function of a stator flux and current is:

$$T_m = c(\vec{\Psi}_s \times \vec{i}_s) \quad (1)$$

where:

$T_m$=electric moment,
c=constant coefficient,
$\vec{\Psi}_s$=stator flux, and
$\vec{i}_s$=stator current.

Consequently, a controlled moment control requires that, in addition to the current, the stator flux of the machine or a magnitude proportional to that (such as rotor flux or air gap flux) is known. For starting a squirrel cage induction machine it is desirable that a starting to the rotating residual flux can take place as quickly as possible, without moment shocks and current peaks.

The generally known differential and current equations of the stator and rotor of a squirrel cage induction machine in a coordinate system of the stator are:

$$\vec{u}_s = R_s \vec{i}_s + \frac{d\vec{\Psi}_s}{dt} \quad (2)$$

$$0 = R_r \vec{i}_r + \frac{d\vec{\Psi}_r}{dt} - j\omega_m \vec{\Psi}_r \quad (3)$$

$$\vec{\Psi}_r = L_s \vec{i}_s + L_m \vec{i}_r \quad (4)$$

$$\vec{\Psi}_s = L_r \vec{i}_r + L_m \vec{i}_s \quad (5)$$

where:

$\vec{\Psi}_r$=rotor flux,
$\vec{i}_r$=rotor resistance,
$\omega_m$=mechanical rotational speed,
$R_r$=rotor resistance,
$R_s$=stator resistance,
$L_s$=stator inductance,
$L_r$=rotor inductance, and
$L_m$=main inductance.

Further, it is possible to derive from the equations 4 and 5

$$\sigma L_s \vec{i}_s = \vec{\Psi}_s - \frac{L_m}{L_r} \vec{\Psi}_r \quad (6)$$

where:

$$\sigma = 1 - \frac{L_m^2}{L_s L_r}$$

=leakage coefficient.

When control pulses are eliminated from inverter switches, i.e. an individual switch is not connected to an upper or a lower branch of the inverter but is left totally unconnected, the stator circuit of the squirrel cage induction machine is switched off and the stator current is set to zero after a very quick transient. After the control pulses have been quenched, the stator current can flow via idle current diodes of the inverter switches only. After this the stator flux is maintained by the rotor current alone. After unwinding the stator winding, the stator flux follows the equation:

$$\vec{\Psi}_s = \frac{L_m}{L_r} \Psi_{r0} e^{-(\frac{t}{\tau_r})} e^{j\omega t} \quad (7)$$

where $\Psi_{r0}$=rotor flux at unwinding moment of stator winding,
$\tau_r = L_r/r_r$, i.e. time constant of rotor,
$\omega$=residual flux frequency, and
t=time.

A decreasing residual flux does not generate a moment and the stator and rotor flux have the same phases:

$$\vec{\Psi}_s = \frac{L_m}{L_s} \vec{\Psi}_r \quad (8)$$

SUMMARY OF THE INVENTION

On the basis of the theoretical background described above, it is possible to provide a method, by means of which the rotational speed, size and instantaneous direction of the residual flux of a squirrel cage induction machine can be determined very quickly in order to be used for a direct starting of the squirrel cage induction machine. These necessary properties of the residual flux can be determined by means of the method of the invention, comprising steps of short-circuiting stator windings, measuring a first stator current vector and switching off the stator circuit at the end of a first time period, short-circuiting the stator windings once more after a second time period from the end of the first time period, measuring a second stator current vector and switching off the stator circuit after a time period identical with the first time period from the second short-circuiting, determining the frequency of the residual flux on the basis of the directions of the first and the second stator current vector and the lengths of the first and the second time period, determining the size of an absolute value of the residual flux on the basis of the total leakage inductance of the squirrel cage induction machine and the first or the second stator current vector and determining the instantaneous direction of the residual flux on the basis of the direction of the first or the second stator current vector.

The simplest way of short-circuiting the stator windings is to adjust all switches of the lower inverter branch or all switches of the upper inverter branch to be simultaneously conductive and of switching off the stator circuit to leave out the control pulses of all inverter switches.

On the other hand, the instantaneous direction of the residual flux can be determined by turning the stator current vector 90 degrees in the rotation direction of the residual flux.

In accordance with the introduction, the only basic data the method of the invention needs is the total leakage inductance $\sigma L_s$. Accordingly, the method does not need any advance information on the residual flux frequency.

The method of the invention can be applied when a squirrel cage induction machine is supplied by an inverter comprising a separate moment and flux control or a moment and magnetization current control, which is faster than the time constant of the squirrel cage induction machine. The inverter shall include sufficient measurements to make it possible to determine the stator flux at a speed required by the method. No measurement of phase voltages is needed for a direct starting according to the method.

BRIEF DESCRIPTION OF THE DRAWINGS

In the following the method of the invention and the calculation formulas used therein are described in greater detail referring to the attached drawing, in which.

DESCRIPTION OF THE PREFERRED EMBODIMENT

Figure 1:
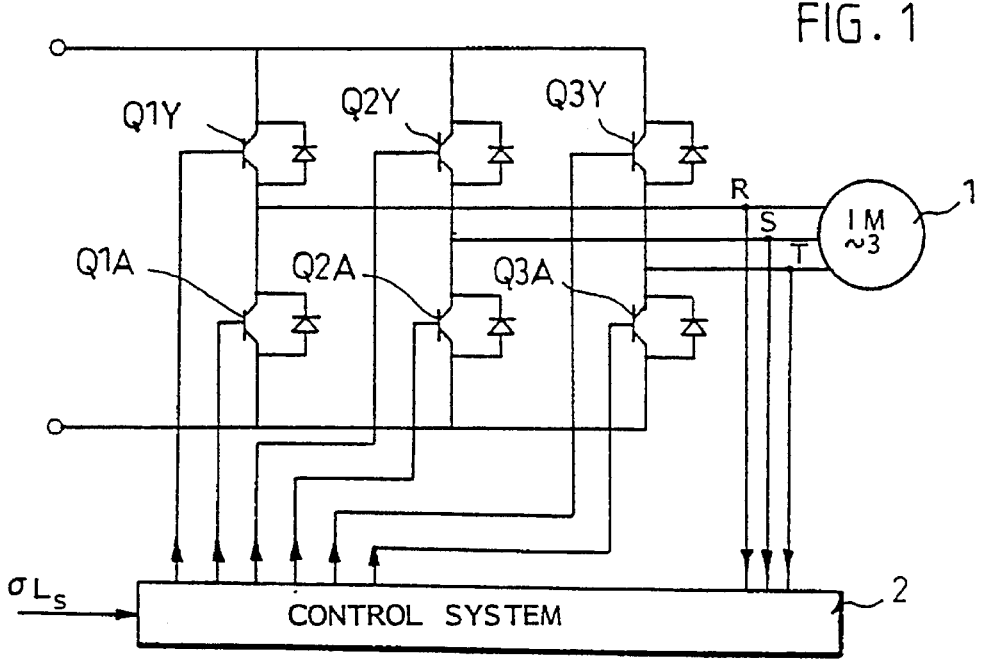
FIG. 1 shows a general diagram of an inverter drive utilizing the method of the invention.

FIG. 1 shows schematically an inverter drive comprising a control system 2, which receives as basic data a total leakage inductance $\sigma L_s$ of a squirrel cage induction machine and measures stator currents from a motor 1 and controls switches Q1Y, Q2Y and Q3Y of an upper branch of the inverter as well as switches Q1A, Q2A and Q3A of a lower branch of the inverter on the basis of these data. An idle current diode is connected in parallel with each switch.

At a direct starting according to the method, a zero indicator is firstly connected to the squirrel cage induction machine, which means that stator windings of the squirrel cage induction machine are short-circuited, i.e. all lower branch switches or all upper branch switches of the inverter are adjusted to be simultaneously conductive. This step is indicated in the flow chart of FIG. 4 by the reference numeral 41. The squirrel cage induction machine then forms a stator current, if there exists a flux therein and it rotates. The current vector generated is directly proportional to the length and the rotational speed of the flux vector and to the short-circuit or total leakage inductance $\sigma L_s$. The stator current vector begins to increase from the origo at the beginning of the short-circuiting and increases very quickly, almost straight to begin with, but curves in the rotation direction of the residual flux while the short-circuiting is lasting.

At the following step, the stator current $\vec{i}_{s1}$ generated is measured and the stator circuit is switched off simultaneously, i.e. control pulses of all switches of the inverter are left out. By then the short-circuiting has continued a time $T_1$. This step is indicated in the flow chart of FIG. 4 by the reference numeral 42. On the basis of this measured stator current vector $\vec{i}_{s1}$, a conclusion is made at step 43 of the flow chart 4, whether there is a rotating residual flux in the squirrel cage induction machine. A zero indicator stops the stator flux in place and in a short term the rotor flux continues rotating at the residual flux frequency. If the stator current does not differ from zero, it is concluded that stator and rotor fluxes have not differed from each other during the zero indicator. There are two possible reasons for this, either the fluxes are zero vectors or the rotational speed of the fluxes is zero or very close to zero. In neither case is it possible to determine the residual flux by the method of the invention and thus to start the squirrel cage induction machine to this residual flux, but it is found out that it is possible to examine whether the machine is rotating or not. If a residual flux exists, but it rotates at a very low or insignificant frequency, the current generated during the zero indicator is very small, and consequently, the current or the residual flux is not observable. Accordingly, the squirrel cage induction machine can then be started by conventional methods, e.g. by a traditional dc-magnetization.

Figure 4:
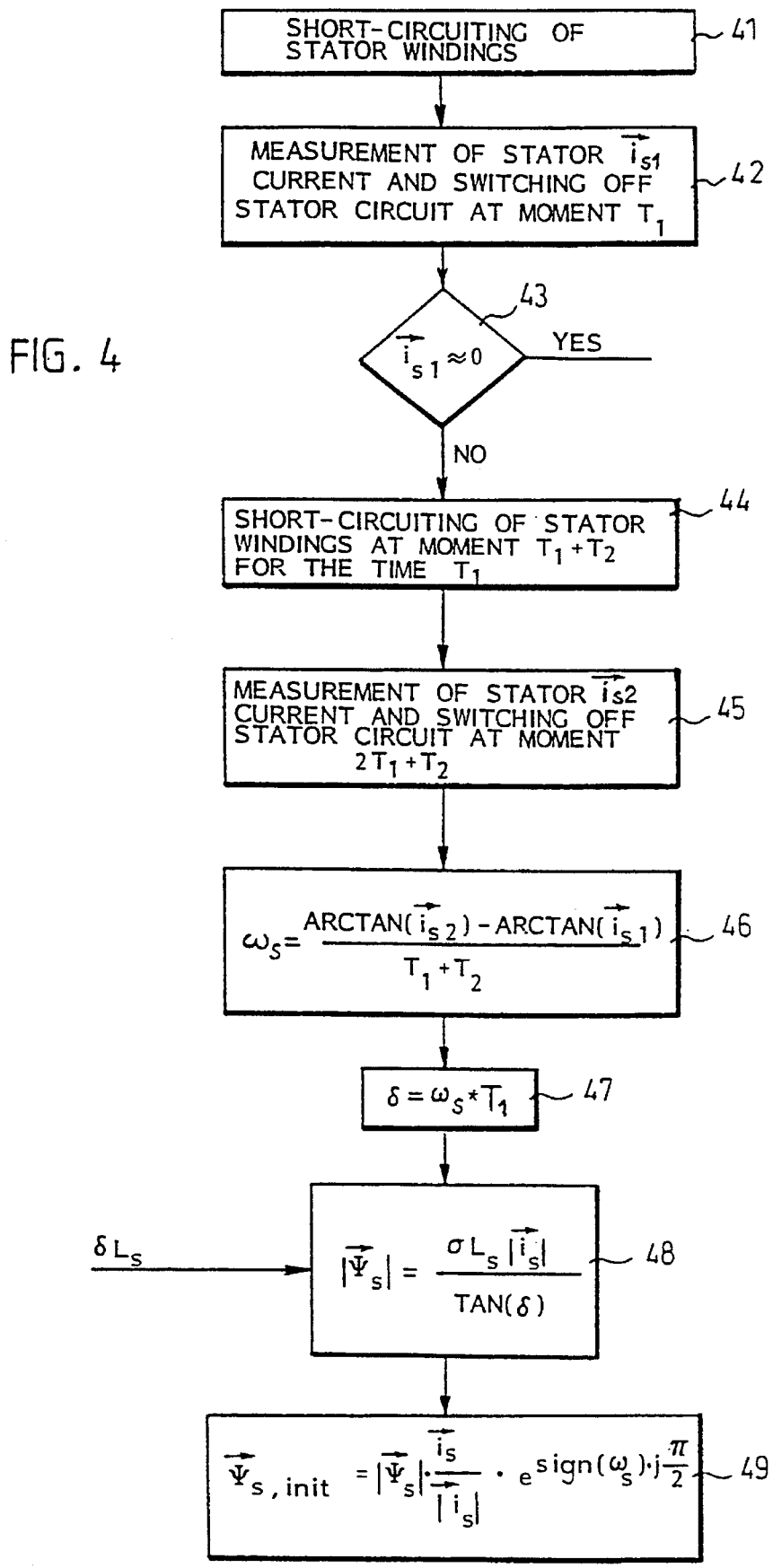
FIG. 4 shows the method of the invention as a flow chart.

If the stator current vector measured at the first short-circuiting is not approximately zero, it is proceeded to step 44 of the flow chart of FIG. 4, at which step the stator windings are short-circuited once more for the time $T_1$. Before this, after the stator circuit had been switched off, the stator and rotor fluxes had taken parallel directions, because the stator current had been set to zero. A second short-circuiting, having a duration $T_1$ as well, is performed after a time period $T_2$ from the concluding moment of the first short-circuiting. At the end of the second short-circuiting, the stator current vector $\vec{i}_{s2}$ is remeasured. This step is indicated in the flow chart of FIG. 4 by the reference numeral 45. After this, the frequency $\omega_s$ of the residual flow can be calculated from the stator current vectors $\vec{i}_{s1}$ and $\vec{i}_{s2}$ effective at the concluding moments of the first and the second short-circuiting, supposing that the time $T_1$ is so short that the flux does not manage to run half a revolution during that time. The stator frequency $\omega_s$ is calculated from arcus tangents of the currents as follows $$\omega_s = \frac{\arctan(\vec{i}_{s2}) - \arctan(\vec{i}_{s1})}{T_1 + T_2} \quad (9)$$

where:

$\vec{i}_{s1}$=stator current measured at the end of a first zero indicator $\vec{i}_{s2}$=stator current measured at the end of a second zero indicator $T_1$=duration of zero indicator and $T_2$=time without control pulses between zero indicators.

In the method of the invention, the frequency of the residual flux is thus calculated on the basis of current angles generated during short-circuiting. An initial value of the stator frequency determined in this way can be utilized for initializing the control of the squirrel cage induction machine besides in the method of the invention also otherwise.

Figure 2:
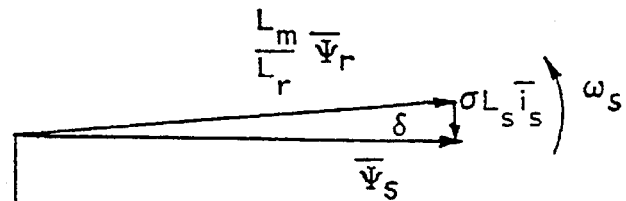
FIG. 2 shows the behaviour of a stator and rotor flux and a stator current at a short-circuiting of a stator winding, when there is a residual flux in the squirrel cage induction machine, which flux rotates at a frequency $\omega_s$.

For the determination of an absolute value of the stator flux $\vec{\Psi}_s$, it is necessary, to begin with, to determine an angle $\delta$ formed between the stator and rotor flux and corresponding to the stator current generated during the zero indicator. FIG. 2 illustrates the calculation of this angle $\delta$. The stator and rotor flux vectors and the angle $\delta$ between them are marked in FIG. 2 according to the equation 6 described above. FIG. 2 additionally shows the rotation direction of the residual flux at a frequency $\omega_s$ as well as the stator current vector $i_s$. Because the time $T_1$ of the zero indicator is very short compared with the time constants of the stator and rotor flux and with the basic frequency $\omega_s$ of the residual flux, assumptions can be made that the absolute values of the fluxes do not change during the time $T_1$. By these assumptions, justified in a short term, the angle $\delta$ can be calculated, the rotor flux of which turns from the stator flux during the short-circuiting of the stator. This angle $\delta$ can be calculated from the following equation.

$$\delta = \omega_s * T_1 \quad (10)$$

Further, because $T_1$ is sufficiently short, the angle $\delta$ generated between the fluxes at the end of the zero indicator is sufficiently small and an equation $$|\vec{\Psi}_s| = \frac{\sigma L_s |\vec{i}_s|}{\tan(\delta)} \quad (11)$$

can be used for the absolute value of the stator flux without the accuracy suffering, when the size of is known and the stator current is measured. Since the angle $\delta$ is small, it is possible to use $\sin(\delta)$ instead of $\tan(\delta)$, i.e. directly $\delta$ expressed as radians, to decrease the amount of computings without the accuracy suffering. As has appeared from above, the total leakage inductance $\delta L_s$ of the squirrel cage induction machine is the only parameter to be known in advance required by the method.

Figure 3:
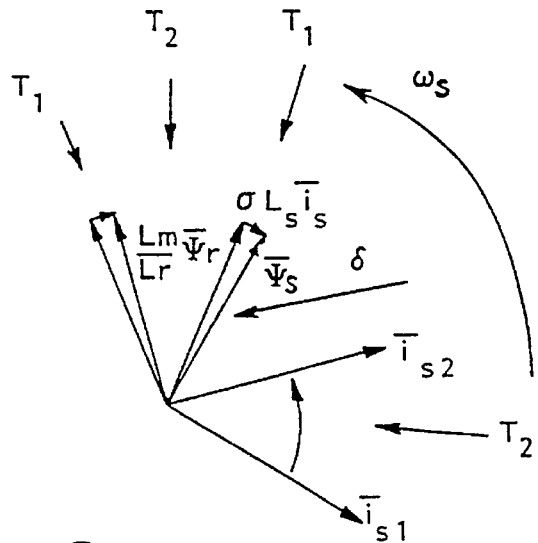
FIG. 3 shows the behaviour of the stator and rotor flux and the stator current at various stages of the method of the invention.

In the flow chart of FIG. 4, the above calculation of the angle $\delta$ is described at step 47 of the flow chart and the calculation of the absolute value of the stator residual flux in block 48 of the flow chart. A corresponding situation is illustrated in FIG. 3. It shows the stator current vectors $\vec{i}_{s1}$ and $\vec{i}_{s2}$ generated in short-circuiting situations and the respective stator and rotor flux vectors as well as the duration $T_1$ of the short-circuitings and the time $T_2$ between them.

On the basis of the absolute value of the residual flux $\vec{\Psi}_s$ calculated above, it is possible to determine the value of the residual flux, after the direction of the residual flux has been found out. As can be seen from FIGS. 2 and 3, the stator current measured at the end of the short-circuiting or the zero indicator is 90 degrees behind the respective stator flux. The direction of the stator flux can thus be calculated on the basis of the direction of the stator current by turning the rotation direction 90 degrees. An initial value $\vec{\Psi}_{s,init}$ can then be determined on the basis of the absolute value of the stator flux and on the basis of the stator current vector, which has been turned 90 degrees and standardized, according to the following equation:

$$\vec{\Psi}_{s,init} = |\vec{\Psi}_s| \cdot \frac{\vec{i}_s}{|\vec{i}_s|} \cdot e^{sign(\omega_s) \cdot j \cdot \frac{\pi}{2}} \quad (12)$$

where $sign(\omega_s)$=sign of residual frequency and $\vec{\Psi}_{s,init}$=initial value of stator flux at direct starting.

After the size of the residual flux has been determined by utilizing the method of the invention, it can be used directly as an initial value of flux control, and a direct change-over to normal control is possible.

If the initial value $\vec{\Psi}_{s,init}$ of the stator flux is lower than the reference value of the flux control, the initial value of the flux shall be used as a control value instead of a nominal flux reference and the flux reference shall be increased at a speed proportional to the rotor time constant.

The method of the invention is characterized in that the squirrel cage induction machine is fully controllable as soon as the initial value of the flux has been estimated. However, the moment permissible after direct starting is proportional to the stator flux and a nominal moment cannot be used until the stator flux has increased to the nominal value without exceeding the nominal current value.

Above the equations to be used in the method according to the invention have been given some exemplifying expressions only and it is understandable that equations differing from the above ones can be derived from the same measuring data, which equations still lead to the desired final result, without differing from the scope of protection defined by the attached claims.

We claim:

1. Method for determining rotational speed, size and instantaneous direction of a residual flux of an inverter-supplied squirrel cage induction machine, to be used for starting the squirrel cage induction machine when there is a rotating residual flux in the machine, and the total leakage inductance of the machine is known, comprising the steps of:

short-circuiting the stator windings;

measuring a first stator current vector and switching off the stator circuit at the end of a first time period;

short-circuiting the stator windings once more after a second time period from the end of the first time period;

measuring a second stator current vector and switching off the stator circuit after a third time period identical with the first time period from the second short-circuiting;

determining the frequency of the residual flux on the basis of the directions of the first and the second stator current vector and the lengths of the first and the second time period;

determining the size of an absolute value of the residual flux on the basis of the total leakage inductance of the squirrel cage induction machine and one of the first and the second stator current vector; and determining the instantaneous direction of the residual flux on the basis of the direction of one of the first and the second stator current vector.

2. A method according to claim 1, wherein the stator windings are short-circuited by adjusting one of all switches of a lower branch of the inverter and all switches of an upper branch of the inverter to be simultaneously conductive and the stator circuit is switched off by leaving out control pulses of all switches of the inverter.

3. A method according to claim 2, wherein the instantaneous direction of the residual flux is determined by turning the stator current vector 90 degrees in the rotation direction of the residual flux.

4. A method according to claim 1, wherein the instantaneous direction of the residual flux is determined by turning the stator current vector 90 degrees in the rotation direction of the residual flux.

5. Apparatus for determining rotational speed, size and instantaneous direction of a residual flux of an inverter-supplied squirrel cage induction machine, to be used for starting the squirrel cage induction machine when there is a rotating residual flux in the machine, and the total leakage inductance of the machine is known, comprising:

means for short-circuiting the stator windings;

means for measuring a first stator current vector and switching off the stator circuit at the end of a first time period;

means for short-circuiting the stator windings once more after a second time period from the end of the first time period;

means for measuring a second stator current vector and switching off the stator circuit after a third time period identical with the first time period from the second short-circuiting;

means for determining the frequency of the residual flux on the basis of the directions of the first and the second stator current vector and the lengths of the first and the second time period;

means for determining the size of an absolute value of the residual flux on the basis of the total leakage inductance of the squirrel cage induction machine and one of the first and the second stator current vector; and means for determining the instantaneous direction of the residual flux on the basis of the direction of one of the first and the second stator current vector.

6. Apparatus according to claim 5, wherein said means for short-circuiting include means for adjusting one of all switches of a lower branch of the inverter and all switches of an upper branch of the inverter to be simultaneously conductive and said means for switching off the stator circuit include means for leaving out control pulses of all switches of the inverter.

7. Apparatus according to claim 6, wherein said means for determining the instantaneous direction of the residual flux include means for turning the current vector 90 degrees in the rotation direction of the residual flux.

8. Apparatus according to claim 6, wherein said means for determining the instantaneous direction of the residual flux include means for turning the current vector 90 degrees in the rotation direction of the residual flux.

* * * * *